United States Patent [19]

Dahlin et al.

[11] Patent Number: 4,724,654

[45] Date of Patent: Feb. 16, 1988

[54] EXPANDABLE TYPE LID WELDING PISTON

[75] Inventors: Rune Dahlin, Uppl Vasby; Gustaf Linderoth, Jarfalla, both of Sweden

[73] Assignee: Akerlund & Rausing Licens Aktiebolag, Jarfalla, Sweden

[21] Appl. No.: 52,797

[22] Filed: May 21, 1987

[30] Foreign Application Priority Data

May 26, 1986 [SE] Sweden ............................ 8602386

[51] Int. Cl.⁴ .......................... B67B 5/00; B65B 7/28
[52] U.S. Cl. ........................................ 53/330; 53/357; 53/361; 53/362; 29/238
[58] Field of Search .................. 53/330, 345, 353, 357, 53/362, 361, 366, 328; 29/238, DIG. 43, 283.5

[56] References Cited

U.S. PATENT DOCUMENTS

| | | | |
|---|---|---|---|
| 2,254,577 | 9/1941 | Nelson | 53/362 X |
| 2,364,380 | 12/1944 | Marek | 53/345 X |
| 2,423,965 | 7/1947 | Coyle | 53/362 X |
| 2,685,997 | 8/1954 | Quillinan | 53/330 |
| 2,703,952 | 3/1955 | Perriguey | 53/330 X |
| 2,835,093 | 5/1958 | Ford et al. | 53/345 |
| 2,950,590 | 8/1960 | O'Brien et al. | 53/345 X |
| 3,961,463 | 6/1976 | Dimond et al. | 53/330 X |
| 4,599,123 | 7/1986 | Christensson | 53/362 X |
| 4,640,733 | 2/1987 | Bogren | 53/361 X |

Primary Examiner—Horace M. Culver
Attorney, Agent, or Firm—James E. Nilles

[57] ABSTRACT

A plunger (4) for joining an inner workpiece (7) to an outer tubular workpiece (2) is disclosed. The plunger includes an expansion element (9) which engages the inner workpiece and crimps it to the outer workpiece. The expansion element (9) is an annular cup-shaped resilient element which is mounted on a part (21) which is movable relative to a body (8) and to a bottom plate (16). The body (8) and its bottom plate (16) are provided with guide surfaces which are spaced apart to provide a space through which the expansion element may pass upon movement of member 21. The guide surfaces constrain the resilient expansion element to move into pressure applying engagement with the inner workpiece.

8 Claims, 6 Drawing Figures

EXPANDABLE TYPE LID WELDING PISTON

FIELD OF THE INVENTION

The present invention relates to an expandable type piston or plunger whereby a radially outward force can be exerted around an inner surface of a substantially tubular workpiece that surrounds the plunger; and the invention is more particularly concerned with an expandable plunger that comprises upper and lower parts, one of which is axially movable towards and from the other, and an expansion element which is confined between those parts and which has at least a radially outer portion that is resiliently deformable to be radially expanded for exerting radial force in consequence of axial movement of the one part towards the other.

BACKGROUND OF THE INVENTION

An expandable-type plunger of the type to which this invention relates is useful in the production of containers. Initially it is moved downward to insert an internal closure into the upper end portion of a tubular container sleeve. Such an end closure has a flat lid portion which extends across the sleeve and has an upwardly projecting rim portion which surrounds its lid portion and which overlies the inner surface of the sleeve all around the same. When the end closure has been brought into proper relationship to the sleeve, expansion of the expandable element of the plunger serves to force the rim portion of the closure into tight engagement with the sleeve all around the same, to effect a sealing bond between the sleeve and the closure. Such a plunger is useful for other purposes when it is desired to provide a temporary radial expansion of a force exerting element, as for example in pressure forming a portion of a tube.

The present invention is of special value for high frequency welding an internal end closure to a tubular container sleeve, especially where the body of the sleeve is of a material such as cardboard or plastic that does not absorb high frequency energy but where there is a layer of material (such as aluminum) that absorbs high frequency energy on the inner surface of the sleeve or the outer surface of the closure rim, or both, and over this layer is another layer of a heat weldable material (such as a suitable plastic) that is heated to its fusion point by induced heating of the energy absorbing layer.

Because of its particular utility in such high frequency bonding, the invention is herein described mainly with reference to the weld sealing of an end closure in a tubular container sleeve.

For maintaining the rim portion of the closure in firm engagement with the tubular sleeve all around the latter during a high frequency welding operation, to produce a seal that is liquid-tight and even gas-tight, it is known to use a radially expandable plunger that is radially expanded when the high frequency current is applied and which is maintained in its expanded condition until the current is cut off and the weldable layers of material have cooled enough to provide a sealed joint. In many cases the closure is formed from an initially flat blank that is flatwise engaged by a bottom surface on the plunger and is forced downward through a forming ring which is fixed just above the container sleeve into which the closure is being inserted. As the plunger forces the blank down through this ring, the plunger and the forming ring cooperate to fold back the rim portion of the closure, and, continuing its downward motion, the plunger carries the closure down into the upper end portion of the tubular sleeve. The plunger that effects this forming and insertion of the end closure is preferably the same one that maintains the rim portion of the closure firmly engaged with the sleeve during the bonding operation.

Expandable plungers heretofore used in operations such as described above are disclosed in U.S. Pat. No. 2,423,965, to Coyle and in the applicant's U.S. Pat. No. 4,640,733 (counterpart of Swedish Patent No. 8302841-5). Each of these plungers comprised two parts, one of which was axially movable relative to the other, and a ring of rubber-like elastic material that was confined between those parts to be axially compressed by their relative motion in one direction and thereby expanded radially outwardly.

The expandable plunger of the Coyle patent provides a very large surface for engagement against the rim portion of the end closure because its expandable element has a substantially large axial extension. It is therefore unsuitable for producing a liquid-proof seal, or even a powder-proof seal, because the material of the expandable element, when expanded, contacts folds and wrinkles in the rim portion of the end closure that are inevitably produced when the end closure blank is forced through the forming ring. Such folds and wrinkles are of increasing size at increasing distances from the flat lid portion of the end closure, and therefore it is desirable to apply radially outward sealing force to the rim portion in a zone that is as close as possible to the flat lid portion, in order to obtain an optimum seal. With the arrangement disclosed by Coyle, the radially outward force applied to the rim portion cannot be a very high one because it is distributed over a large area of the rim portion, and it cannot be exerted in close proximity to the lid portion.

The expandable rubber ring of the plunger disclosed in the applicant's above identified patent has only a small axial extension, so that it applies force to only a limited area of the end closure rim to compress it strongly against the tubular sleeve, and the cooperating parts of the plunger that deform the expandable element are so arranged that its radially expanded portion is close to the bottom surface of the plunger, to exert force on the end closure rim in a zone around it at which folds and wrinkles are at a minimum and thus present the least interference with the production of a tight seal between that rim portion and the container sleeve.

In both of these prior expandable-type plungers the expandable element was substantially in the shape of a ring and was therefore suitable only for containers of circular or substantially circular cross-section. Such rings of rubber or rubberlike material have the further disadvantage that they wear out rather quickly and thus cause shut-downs for their replacement. Such a ring generally cannot be positively guided during its contraction after being expanded, and in a rapidly operating machine it therefore may not fully return to its initial shape before the plunger is fully withdrawn from a container sleeve, with the result that the ring may stick to the rim portion of the closure and be damaged or forced off of the plunger.

SUMMARY OF THE INVENTION

The general object of this invention is to provide an expandable-type plunger which does not have the above discussed disadvantages and which can be configured for containers of markedly non-circular cross-section as well as for containers of circular cross-section.

Another and more specific object of the invention is to provide an expandable-type plunger which can exert a high and uniform radially outward force against the rim portion of an end closure all around that rim portion and in a zone close to its lid portion, but which can be arranged, if desired, to provide a radially outward force which is stronger at some parts of the rim portion than at others.

Other specific objects of the invention are to provide an expandable-type plunger wherein:

The expandable element is under positive guidance during its contraction as well as during its expansion, so that the plunger is capable of operating more quickly and more safely than prior expandable-type plungers;

The place where the expandable element of the plunger is to be expanded can be accurately guided and determined;

The force applying surface of the expandable element can have any desired shape and size and consequently can apply different pressing forces at different points around the rim portion of an end closure if desired;

By selection of the material and dimensions of the expandable element it can be caused to apply whatever pressing force is desired; and The expandable element can be arranged to apply pressing force as close as may be desired to the plane of the end closure lid portion, so as to avoid problems due to wrinkles and folds in end closure rim portions.

BRIEF DESCRIPTION OF DRAWINGS

In the accompanying drawings, which illustrate what are now regarded as preferred embodiments of the invention.

DETAILED DESCRIPTION OF PREFERRED EMBODIMENTS OF THE INVENTION

Figure 1:
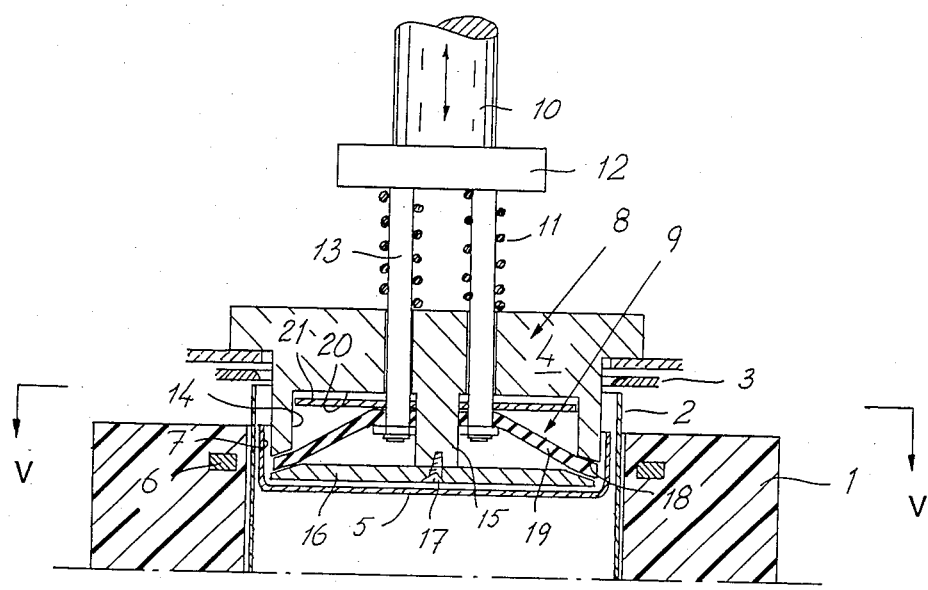
FIG. 1 is a view in longitudinal section of an apparatus that embodies the invention, useful for inserting into a tubular container sleeve an internal end closure having a flat lid portion and an upwardly folded rim portion which surrounds the lid portion and for welding the rim portion to the sleeve, the apparatus being shown in the condition in which the plunger is received in the carrier but is unexpanded.
Figure 2:
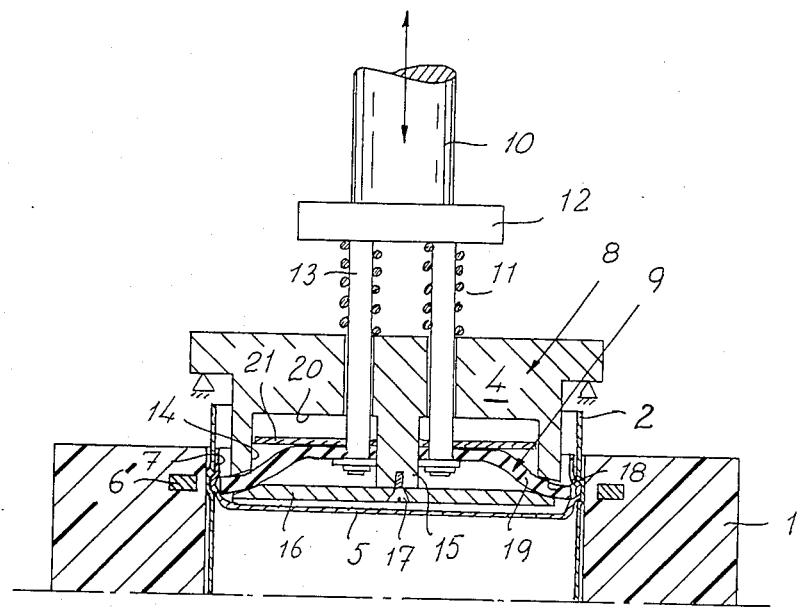
FIG. 2 is a view generally similar to FIG. 1 but showing the plunger expanded.

The apparatus shown in FIGS. 1 and 2 generally comprises a carrier 1 in which a container sleeve 2 is immobilized and which closely surrounds the sleeve and particularly its upper end portion. Spaced above the carrier 1 and coaxial with it is a fixed forming ring 3 through which a flat end closure blank is forced downward by an expandable-type plunger 4 of this invention. In a known manner the plunger 4 cooperates with the forming ring 3 to shape the blank into an end closure 5 that has a flat lid portion which underlies the bottom of the plunger and an upwardly projecting rim portion 7 that surrounds its lid portion. After thus forming the end closure 5, the plunger 4 continues its downward motion until it is received in the carrier 1 as shown in FIG. 1, thereby inserting the end closure into the sleeve 2 with the lid portion of the end closure extending across the upper end of the sleeve and the rim portion 7 overlying the inner surface of the sleeve all around the same.

The carrier 1 is of a known type, provided with a high frequency welding ring 6 which is energized while the plunger, in its condition shown in FIG. 2, cooperates with the carrier to clampwise maintain the end closure rim portion 7 in firm engagement with the sleeve 2 to ensure that the welding operation will result in a good sealing bond between them.

The plunger comprises a generally cylindrical body portion 8 and an expansion element 9 which are carried for up and down movement on an axially movable shaft 10 so that the plunger can be displaced between an upper position in which it is spaced above the forming ring 3 and the lowered position in which it is shown in FIGS. 1 and 2 wherein the body portion 8 is received in the carrier 1. Up and down motion of the plunger is effected in a known manner.

The body portion 8 of the plunger is movable up and down relative to the shaft 10 and is biased downwardly relative to it by several expansion coil springs 11 that are confined between the top of the body portion and a collar-like spring seat support 12 that is fixed on the shaft 10. Each spring 11 surrounds a carrier screw 13 that has its shank extending slidably through the body portion 8 and threaded into the support 12 and has its head engaged under and fixed to a central portion of the expansion element 9. These carrier screws 13 are preferably distributed uniformly around the plunger shaft 10 at a suitable radial distance from it and extend parallel to its axis. Thus the central portion of the expansion element 9 is fixed to the shaft 10 whereas the body portion 8 is movable up and down relative to the shaft. The means for fixing the central portion of the expansion element 9 to the shaft 10 can be regarded as an upper part of the plunger.

The body portion 8 of the plunger is of inverted cup shape, having a downwardly projecting cylindrical side wall 14, and a central pin or boss 15 projects coaxially downwardly in it. A disc-like bottom plate 16, which comprises a lower part of the plunger, is fixed to the boss 15 by a screw 17 or any equivalent means. The boss 15 projects downward to a level slightly below the lower edge 18 of the body side wall 14 so that a gap or slot is formed between the top surface of the bottom plate 16 and the bottom edge 18 of the side wall 14.

The expansion element 9 comprises a wall 19 which extends radially outwardly from its central portion, and at least this wall 19 of the expansion element is made of a resiliently deformable material. When the upper part 10, 11 of the plunger is in a raised position (FIG. 1) relative to the lower part 16, the expansion element 9 is generally of inverted bowl shape and its resiliently deformable wall 19 extends obliquely downwardly and radially outwardly from its central portion. As the upper part 10, 11 of the plunger moves downward relative to its lower part 8, 16, the wall 19 is flattened or spread by its sliding engagement with the lower plate 16 (compare FIGS. 1 and 2) to thus radially expand its radially outer edge.

The wall 19 of the expansion element can be formed to have its downward and radially outwardly divergent configuration when it is in its relaxed condition, to be flattened and spread by relative axial convergence between the upper part 10, 11 of the plunger and its lower part 16; or that wall 19 can be initially flat or substantially flat, to be drawn to its bowl shape and thus radially contracted by axially divergent movement of the upper and lower parts of the plunger, in which case the lower edge 18 of the cylindrical wall 14 will play a particularly important role in guiding the expansion element wall 19 to its radially contracted condition.

The degree of elasticity of the resiliently deformable wall 19 will depend upon the desired extent of radial dilation of the expansion element. If a relatively large change in radius is desired, it can be made of rubber, fibre reinforced rubber, elastic plastic, or similar material; if a relatively small change in radius is needed it can be made of relatively hard rubber or reinforced rubber or plastic material or even of a metal such as brass or spring steel. In many cases it will be preferable that all portions of the wall 19 are of uniform thickness. The central portion of the expansion unit can be formed integrally with its wall 19, as shown in FIGS. 1 and 2, and has a central bore in which the boss 15 is received. To prevent the wall 19 from being folded by its motion relative to the lower plate 16 and/or the bottom edge 18 of the wall 14 a rigid support disc 20 can be supported by the carrier screws 11 and fixed by them in overlying relation to the central portion of the expansion element. The wall 19 of the expansion element should be so dimensioned that in its unexpanded or retracted condition its radially outer edge is located near to but entirely inside the peripheral edge of the lower part 16 and the radially outer surface of the cylindrical wall 14.

Figure 3:
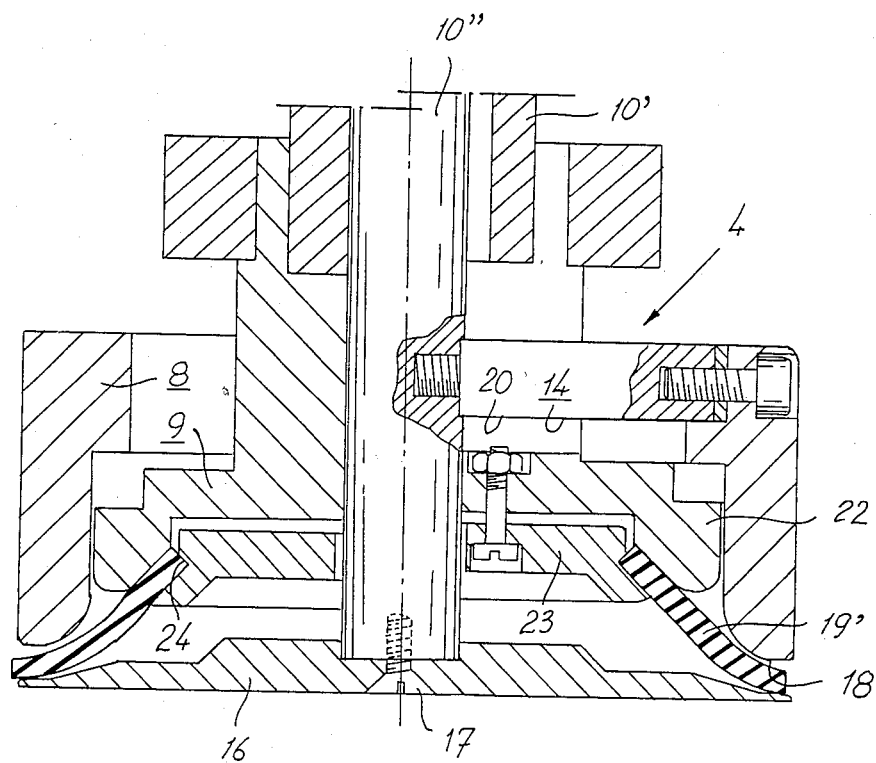
FIG. 3 is a view in longitudinal section of a modified form of the plunger of this invention, shown in its unexpanded condition.

In the embodiment illustrated in FIG. 3 the resiliently deformable wall 19' of the expansion unit is annular to have a radially inner edge portion that is clamped between an upper support disc 22 and a lower support disc 23, which discs comprise the central portion of the expansion unit. One of these support discs, in this case the lower one 23, has a shoulder 24 against which the radially inner edge of the wall 19' is supported. In this case the upper part of the plunger, which moves up and down relative to the lower part 16 to effect expansion and contraction of the wall 19', comprises a tubular shaft 10' to which the support discs 22, 23 are fixed and which concentrically surrounds a solid relatively fixed shaft 10''. The bottom part 16 is fixed to the bottom of the fixed shaft 10'', and the inverted cup-shaped body portion 8 of the plunger is also secured in a suitable manner to that shaft 10''. If the shoulder 24 on the lower support disc 23 has a radius larger than that of the inner edge of the wall 19', the wall will be elastically deformed by its connection to the central portion 22, 23, to be more nearly vertical, and there will then be decreased friction against the bottom edge 18 of the cylindrical wall 14 and against the bottom part 16.

The magnitude of the change in radius of the expansion element, as between its contracted and expanded conditions, is determined by the relative vertical movement between the bottom part 16 of the plunger and the top part of the plunger to which the central portion of the expansion member is fixed, increasing with increased length of that stroke. In the case of a plunger having a circular cross-section, the relationship between that stroke length and outside diameter of the expansion element is the sole factor controlling the magnitude of that change.

However, a plunger of this invention may be of other than circular shape, as for example oval, square, rectangular or polygonal; but in any case it will preferably have rounded corners.

Figure 4:
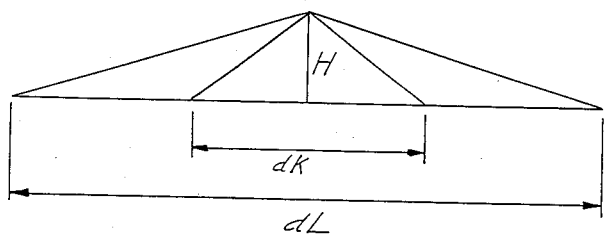
FIG. 4 is an explanatory diagram showing dimensional relationships in a non-circular expandable element of a plunger of this invention.
Figure 5:
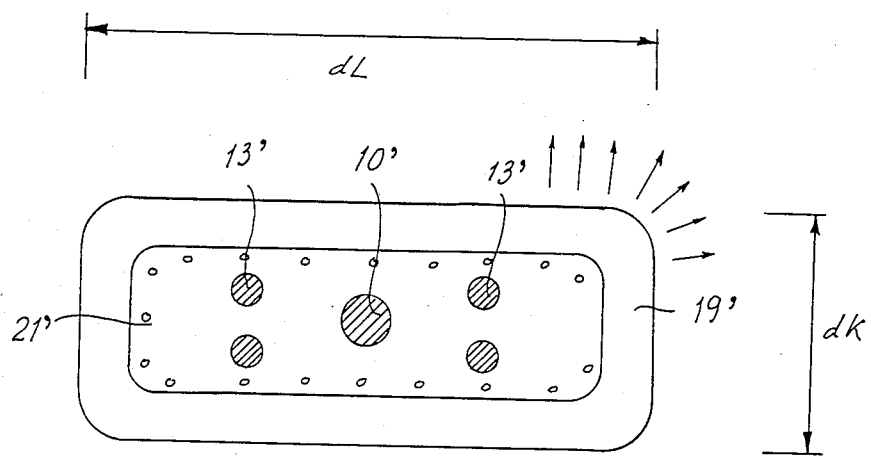
FIG. 5. is a view in cross-section through one form of plunger of this invention, taken on the plane of the line V—V in FIG. 1.

For non-circular shapes the capability for expansion is determined both by the stroke length and by the horizontal length of the resiliently deformable wall. FIGS. 4 and 5 illustrate one of many possible examples of non-circular configurations of plunger cross-section in which this invention can be used, for containers of corresponding non-circular cross-sections. In the illustrated case, the resiliently deformable wall 19', which, in plan view, is rectangular with rounded corners, has a larger horizontal dimension dL and a smaller horizontal dimension dK, and the central portion 21' of the expansion element can be moved vertically through the distance H. If the wall 19' is in this case connected at or close to the center of the plunger shaft 10', its expansion would be larger in the dK direction than in the dL direction. In some cases this non-uniform expansion could be utilized to advantage, as where it is desired to have a stronger contact pressure at some places than at others. However, if such non-uniform expansion is not desired, the central portion comprising the support disc 21' can be made with a shape corresponding to that of the container cross-section and the wall 19' can be connected adjacent to the outer edges of the support disc 21' and can be so formed that when it is in its contracted condition its outer edge has the same shape as the container sleeve 2 and the carrier 1, so that uniform expansion is obtained in all directions of dK and dL as well as at the corners as indicated by the arrows in FIG. 5. To locally increase or reduce the contact pressure exerted by the wall 19' in a desired zone around its periphery, its point of connection with the disc 21' radially inwardly from that zone is respectively shifted towards or away from the axis of the shaft 10'.

Since the expansion element is actuated by relative motion between the top and bottom parts of the plunger whereby the force on the expansion element wall 19 is applied mainly at the level of its radially outer edge, the wall 19 is subjected to little vertical compression, if any, and therefore it can provide much higher contact pressures than have heretofore been available with radial pressure plungers, and the force exerting surface of the expansion element, which comprises the radially outer edge of the wall 19, can be much narrower than has heretofore been possible. Thus, a person skilled in the art can design an expansion element of this invention, and particularly the resiliently deformable wall 19 thereof, of any suitable material, with any desired form, of any thickness, and for any desired expansion. The radially outer edge of the expansion element can be squared off to present a narrow radially outwardly facing pressure applying surface, or can be rounded, pointed or otherwise formed as desired. By providing the bottom part 16 with a top surface that is substantially frustoconical and downwardly and radially outwardly divergent, at least in a zone adjacent to its peripheral edge, and giving the lower portion of the resilient wall 19 a corresponding shape, it is possible to so guide the wall 19 in its downward and outward movement for radial expansion that its outer edge engages the rim portion of an end closure very close to the plane of its lid portion. Alternatively, the bottom part 16 can be made thicker than as shown, or its top surface can be otherwise so shaped that it guides the outer edge of the expansion unit 19 exactly to desired places.

Figure 6:
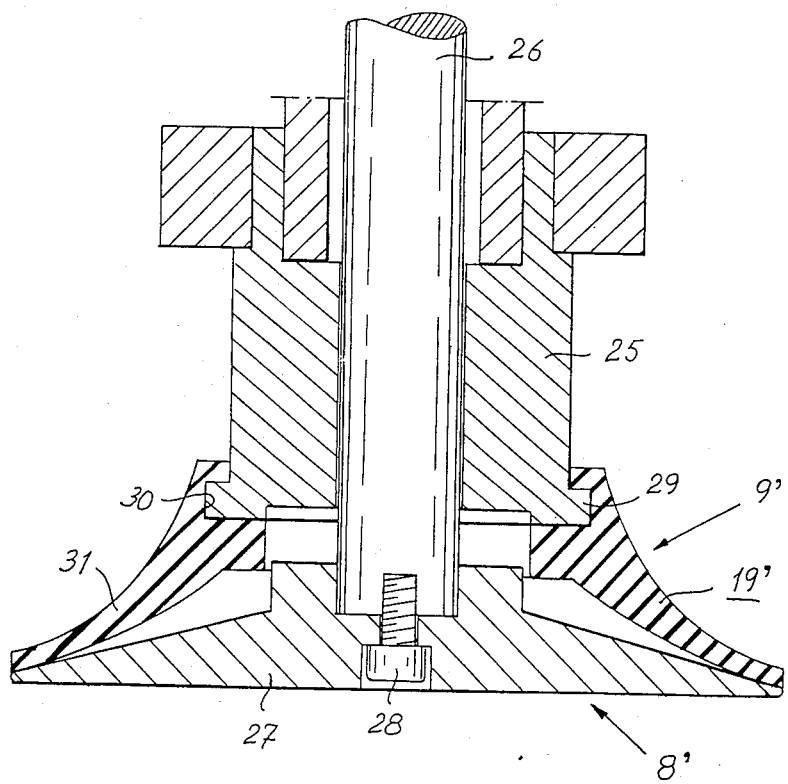
FIG. 6 is a view generally similar to FIG. 3 but showing a further modified embodiment of the invention.

The plunger illustrated in axial cross-section in FIG. 6 differs from that illustrated in FIGS. 1–3 in that it has no cup-shaped body portion that provides a lower edge which guides the resiliently deformable wall in its contraction. Instead, the wall 19' is formed to extend obliquely downwardly and radially outwardly when in its relaxed condition, and the rigid central portion of the expansion element comprises a relatively fixed carrier sleeve 25 in which an inner coaxial shaft 26 is relatively movable up and down. The bottom part 27 of the plunger is fixed to the bottom of the shaft 26 by means of a screw 28. The shaft 26 can be actuated up and down by means of a hydraulic or pneumatic cylinder or by means of a prestressed mechanical spring.

Instead of the sleeve 25 being stationary and the shaft 26 being axially movable, it is obviously possible for the sleeve 25 to be movable up and down in relation to a relatively fixed shaft 26.

In this case the resiliently deformable wall 19' of the expansion element, whch is preferably molded to have the illustrated frustoconical shape in its relaxed condition, is secured to the bottom portion of the sleeve 25 by means of a radially outwardly projecting circumferential land or rib 29 on the sleeve, which can be formed in one piece with it and which is closely received in a mating groove in the radially inner edge portion of the wall 19'. The elasticity of the wall is of course relied upon to maintain this connection. In this case the upper portion of the wall 19' is relatively thick to accommodate the connection with the sleeve 25, and from that connection the wall tapers in thickness to a marginal zone 31 inwardly adjacent to its radially outer edge, and through that zone the wall has a uniform thickness to its outer edge, so that the wall itself provides an expansion lip 31. For normal use in pressing the rim portion of an end closure against a container tube of circular cross-section, having a diameter on the order of 100 to 110 mm, the expansion lip 30 can be made of urethane rubber of 50°–100° Shore, or preferably 90°–100° Shore, and the radially outer part of the lip can have a thickness of 2–5 mm and preferably about 5 mm.

What is claimed as the invention is:

1. A plunger for exerting a radially outward force around an inner surface of a workpiece that substantially surrounds it, said plunger comprising an upper part and a lower part, one of which parts is movable axially towards the other to an expansion position and away from the other to a contraction position, said lower part having a periphery which substantially corresponds in shape to the interior cross-section of said workpiece, and an expansion element which is confined between said upper and lower parts and which is resiliently deformable to be radially expanded for exerting said force in consequence of axial movement of said one part towards said expansion position, said plunger being characterized by:

A. said lower part comprising a bottom member having a top surface which extends radially outwardly to said periphery all around the same;

B. said expansion element comprising a substantially annular resiliently deformable wall having a radially inner portion and a radially outer edge,
   (1) said radially inner portion being secured to said upper part, and
   (2) said wall being formed and arranged for such cooperation with said upper and lower parts that,
      (a) with said one part in its contraction position
         (i) said wall has a downwardly divergent form with substantially all portions thereof extending obliquely downwardly and radially outwardly from said upper part and
         (ii) the radially outer edge of said wall is adjacent to said periphery all around the same and does not project substantially beyond said periphery, and
      (b) as said one part is moved to its expansion position the radially outer edge portion of said wall is spread by sliding engagement with said top surface to thus radially expand the radially outer edge of said wall.

2. The plunger of claim 1 wherein said wall, in its relaxed condition, is substantially flat so that all portions thereof are substantially coplanar, further characterized by:

said lower part further comprising a substantially annular member having a downwardly facing surface that is spaced above said top surface of the bottom member to define therewith a gap through which the radially outer portion of said wall can slide edgewise during movement of said one part to its expansion position, said downwardly facing surface being engageable by the radially outer portion of said wall during movement of said one part to its contraction position to cooperate with said upper part in resiliently deforming the wall to its downwardly divergent form.

3. The plunger of claim 2 wherein said top surface of the bottom member extends to said periphery at a downward and radially outward inclination.

4. The plunger of claim 1 wherein said wall has said downwardly and outwardly divergent form in its relaxed condition.

5. The plunger of claim 1 wherein said radially outer edge of said wall defines a narrow surface that faces substantially radially outwardly.

6. The plunger of claim 1, further characterized by:

said lower part further comprising a substantially annular member having a downwardly facing surface that is spaced from and opposes said top surface of the bottom member and cooperates therewith in defining a slot in which the radially outer portion of said wall is received for sliding guidance as said one part moves between its expansion and contraction positions.

7. The plunger of claim 1 wherein all portions of said wall between its said radially inner portion and its said radially outer edge are of substantially uniform thickness.

8. The plunger of claim 1 wherein said wall tapers radially outwardly in thickness from its said radially inner portion towards its radially outer edge.

* * * * *